United States Patent [19]

Lang et al.

[11] Patent Number: 5,131,279
[45] Date of Patent: Jul. 21, 1992

[54] SENSING ELEMENT FOR AN ULTRASONIC VOLUMETRIC FLOWMETER

[75] Inventors: Michael Lang, Weil-Haltingen, Fed. Rep. of Germany; Michael Steinacher, Basel; Urs Wüst, Dornach, both of Switzerland

[73] Assignee: Flowtec AG, Switzerland

[21] Appl. No.: 648,924

[22] Filed: Feb. 1, 1991

Related U.S. Application Data

[63] Continuation-in-part of Ser. No. 595,421, Oct. 11, 1990.

[30] Foreign Application Priority Data

May 19, 1990 [EP] European Pat. Off. ............ 90109542
Dec. 6, 1990 [EP] European Pat. Off. ............ 90810953

[51] Int. Cl.$^5$ ................................................ G01F 1/66
[52] U.S. Cl. ................................ 73/861.27; 73/861.18
[58] Field of Search ............... 73/597, 861.18, 861.27, 73/861.28, 861.29

[56] References Cited

U.S. PATENT DOCUMENTS

| | | | |
|---|---|---|---|
| 4,185,498 | 1/1980 | Watson et al. | 73/861.27 |
| 4,454,767 | 6/1984 | Shinkai et al. | |
| 4,635,483 | 1/1987 | Mishiro | 73/579 |
| 5,052,230 | 10/1991 | Lang et al. | |

FOREIGN PATENT DOCUMENTS

| | | | |
|---|---|---|---|
| 0036658 | 9/1981 | European Pat. Off. | |
| 0048791 | 4/1982 | European Pat. Off. | 73/861.28 |
| 61-132823 | 6/1986 | Japan | |
| 90/00723 | 1/1990 | PCT Int'l Appl. | |
| 2142431 | 1/1985 | United Kingdom | |

Primary Examiner—Reinhard J. Eisenzopf
Assistant Examiner—E. Shopbell
Attorney, Agent, or Firm—Barnes & Thornburg

[57] ABSTRACT

This sensing element, which is to be installed in a pipeline conducting the fluid to be measured, consists of a straight section of pipe (1) with an unrestricted cross-sectional area and an uninterrupted wall to the external surface of which are positively fixed, successively in the downstream direction and in a spaced-apart relationship: a first resonance absorber (11) at the inlet end consisting of at least one absorber disk (111), a first transducer disk (21) having a first ultrasonic transducer (31) attached to one lateral surface thereof which excites the radial resonance frequency of said first transducer disk (21), a second transducer disk (22) having a second ultrasonic transducer (32) attached to one lateral surface thereof which excites the radial resonance frequency of said second transducer disk (22), and a second resonance absorber (12) at the outlet end consisting of at least one absorber disk (121), the absorber disks (111, 121) being dimensioned so that their respective radial resonance frequencies are equal to the excitation frequencies of the associated ultrasonic transducers.

12 Claims, 4 Drawing Sheets

SENSING ELEMENT FOR AN ULTRASONIC VOLUMETRIC FLOWMETER

This is a continuation-in-part application U.S. Ser. No. 07/595,421 filed Oct. 11, 1990.

The present invention, relates to a sensing element for an ultrasonic volumetric flowmeter which is to be installed in a pipeline conducting the fluid to be measured and consists of a straight section of pipe with an unrestricted cross-sectional area and an uninterruped wall to the external surface of which are positively fixed, successively in the downstream direction and in a spaced-apart relationship: a first resonance absorber at the inlet end consisting of at least one absorber disk, a first transducer disk having at least one first ultrasonic transducer attached to one lateral surface thereof which excites the radial resonance frequency of said first transducer disk, a second transducer disk having at least one second ultrasonic transducer attached to one lateral surface thereof which excites the radial resonance frequency of said second transducer disk, and a second resonance absorber at the outlet end consisting of at least one absorber disk, the absorber disks being dimensioned so that their respective radial resonance frequencies are equal to the excitation frequencies of the associated ultrasonic transducers.

The invention eliminates disadvantages inherent in the ultrasonic-flowmeter principle. The sensing element may be designed for extremely small nominal diameters of the section of pipe, so that low and extremely low volume rates of flow can be measured.

The sensing element is suitable for all types of fluids, regardless of the flow pattern that forms in it. Both laminar and turbulent flow can be measured, but also flow at the limit from laminar to turbulent or flow with widely varying Reynolds number.

The material of the sensing element may be adapted to the aggressivity of the fluid to be measured. The sensing element is suitable for handling food. This is aided by the fact that the section of pipe, because of its uninterrupted interior wall, can be easily cleaned, and because no material will deposit on this wall. If the section of pipe is made of metal or ceramic, high-pressure fluids can be measured, too.

Since the ultrasonic transducers are attached to at least one lateral surface of the transducer disks, they are replaceable without the sensing element having to be removed from the pipeline, i.e., a process within which the volumetric flow rate is measured, for example, need not be interrupted.

An especially suitable electronic measuring and operating circuit is the one described in detail in applicant's own WO-A 90/00723, where the ultrasonic transducers are operated alternately as ultrasonic transmitters and receivers so as to be able to measure the travel time of the ultrasonic waves both in the direction of fluid flow and in the direction opposite flow.

The design of the sensing element in accordance with the invention also makes it possible to adjust the distance between the transducer disks so that the travel-time differences occurring during operation can be processed by the associated measuring and operating circuit.

The ultrasonic transducers are made of a suitable piezoelectric material, e.g., piezoelectric ceramic. The transmitting transducer is brought to mechanical resonance by applying an alternating voltage of a suitable frequency, which is achieved in an optimum manner if the electric frequency is equal to one of the mechanical resonance frequencies, so that an ultrasound signal of this (acoustic) frequency will be delivered by the transducer when the latter oscillates freely.

Since, in the present invention, each of the ultrasonic transducers is attached to its associated transducer disk, it excites the latter. This will occur in an optimum manner if one of the mechanical resonance frequencies of the transducer disk is excited, i.e., if this resonance frequency is equal to the acoustic frequency of the transducer. In the invention, the mechanical resonance frequency of the respective transducer disk is one of the radial resonance frequencies of the disk, e.g., the frequency of the zero mode. The transducer disks thus oscillate in the radial direction, so that at the point where they are attached to the section of pipe, this oscillation will be transmitted to the pipe wall and thence to the fluid (cf. FIG. 4).

The receiving ultrasonic transducer is excited by the mechanical oscillation of the transducer disk to provide an alternating voltage of the same frequency. The mechanical oscillation of the transducer disk at its radial resonance frequency is caused via the wall of the section of pipe by the ultrasonic wave travelling in the fluid.

In one embodiment of the invention, the sensing element is completely of metal, e.g., completely of a stainless steel alloy suitable for the intended application. According to another embodiment, however, it is also possible to use different metals for the transducer disks and/or the absorber disks. This is particularly advantageous if, according to a further embodiment, the transducer and absorber disks are made of the same metal with as low a thermoelastic coefficient as possible and the section of pipe is resistant to corrosion, or if the Q of the transducer disks is to be large compared with that of the absorber disks.

In another embodiment of the invention, the section of pipe is provided with a thickened wall over part of its length between the transducer disks. Thus, second signals originating from one of the transducer disks and propagating in the pipe wall, which affect accuracy, can be attenuated to such a level that they will not reach the other transducer disk.

In a further embodiment of the invention, the thickened wall is provided with at least one annular groove which is preferably filled with absorbing material which also covers the cylindrical surface of the wall if necessary. By each of these two measures, a mechanical longitudinalwave filter can thus be implemented.

Similarly, each resonance absorber, particularly if it has more than one absorber disk, may be provided with an absorbing material which fills the spaces between the absorber disks. The cylindrical surfaces may be covered in this case, too.

According to another embodiment of the invention, the sensing element may be provided with a decoupling disk between the respective transducer disk and the adjacent absorber disk, with the dimensions and/or the mechanical properties of the decoupling disk differing from those of the absorber disk.

In a further embodiment of the invention, the sensing element comprises an ultrasonic sensor on each of the transducer disks which is included as an actual-value transmitter in an electronic phase-locked loop for generating an excitation signal for the ultrasonic transducers which is locked to the resonance frequency of the transducer disks.

The invention will become more apparent from the following description of an embodiment taken in conjunction with the accompanying schematic, sectional drawings, in which.

Figure 1:
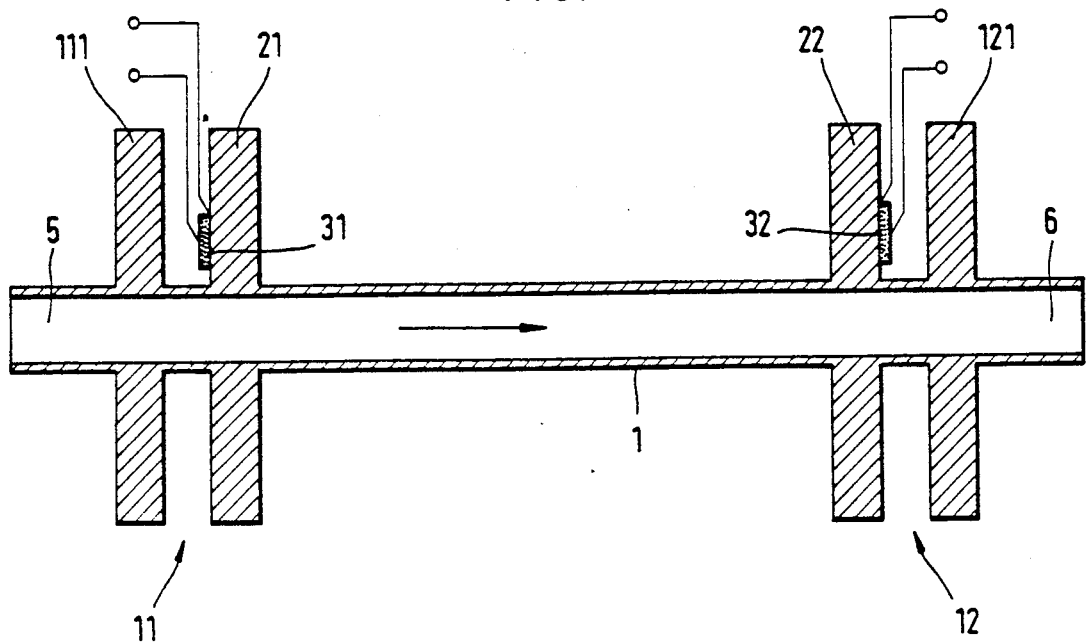
FIG. 1 shows a sensing element with a constant wall thickness of the section of pipe.

FIG. 1 shows an embodiment of a sensing element in a sectional view. The sensing element comprises a section of pipe 1 made of a suitable material, preferably a metal, such s stainless steel. Ceramic or glass materials are also suitable. The material to be chosen depends on the specific application and its parameters, such as type and properties of the fluid to be measured, pressure range, temperature range, environmental conditions, etc.

In FIG. 1, the section of pipe 1, whose inlet 5 and outlet 6 are located at the left and right, respectively, so that the direction of flow is the direction indicated by the arrow, has an unrestricted cross-sectional area and an uninterrupted wall over its entire length. At the input end, a first resonance absorber 11 in the form of an absorber disk 111 is mounted on the external surface of the section of pipe. It is followed, in the direction of flow and at a certain distance, by a first transducer disk 21 having a first ultrasonic transducer 31 attached to its lateral surface.

At the outlet end, a second transducer disk 22 having a second ultrasonic transducer 32 attached to its lateral surface lies opposite the first transducer disk 21. It is followed, in the direction of flow and again at a distance, preferably at the same distance as that between the absorber disk 111 and the transducer disk 21, by a second resonance absorber 12 in the form of an absorber disk 121.

The ultrasonic transducers 31, 32 may also be attached to those lateral surfaces of the transducer disks which face each other, which is particularly advantageous in a compact design. It may also be advantageous, e.g., for reasons of symmetry, to provide two or more, e.g., four, ultrasonic transducers on each of the transducer disks, as may be seen in FIG. 9.

The sensing element is installed in pipeline (not shown) which conducts the fluid to be measured, e.g., by suitable connecting means, such as flanges.

The two resonance absorbers 11, 12 prevent sound energy from reaching the pipeline connected to the sensing element. On the other hand, if that should still be the case, they prevent the reflected energy in the pipeline from being absorbed on its "way back" and, thus, from not reaching the transducer disk 21, 22. Any (undesired) energy of the same frequency that may come from the pipeline will, of course, be absorbed as well.

The absorption properties are based on the fact thta the absorber disks resonate at the ultrasonic frequency, so that they absorb sound energy when being excited. Depending on the Q of the absorber disks, they remove energy from the ultrasonic field even in the steady-state. This removal of energy is dependent on the Q, which can be influenced by an appropriate choice of the material.

Figure 2:
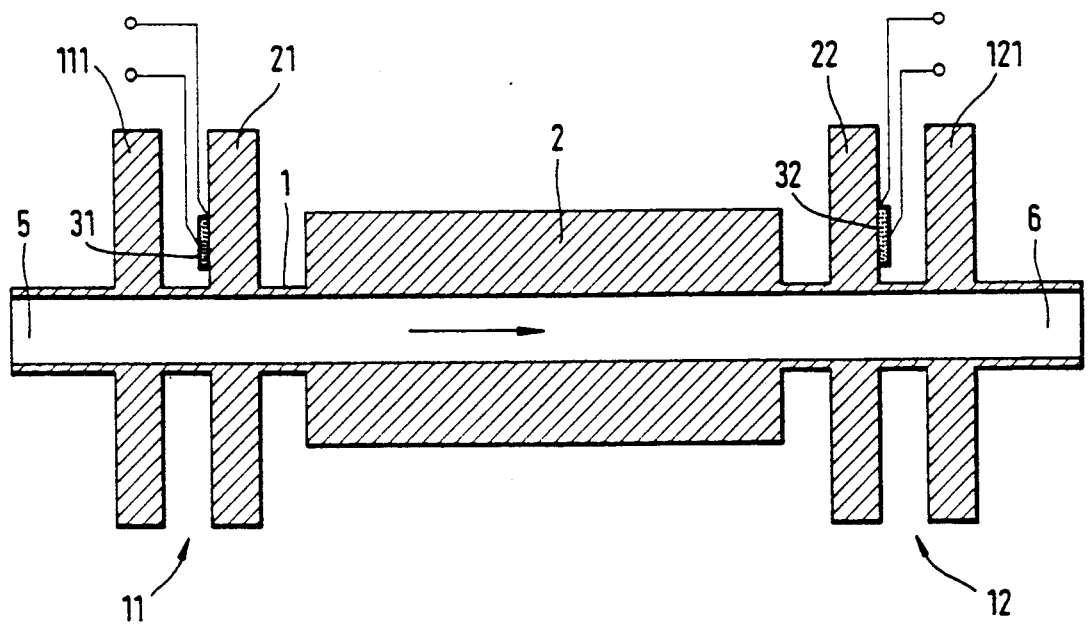
FIG. 2 shows a sensing element with a thickened wall between the transducer disks.

FIG. 2 shows the application of an advantageous measure whereby a longitudinal wave can be prevented from propagating in the wall of the section of pipe 1 between the two transducer disks 21, 22. A longitudinal wave originating from one transducer disk and reaching the other could introduce an error. To avoid such an error, the section of pipe is provided with a thickened wall 2 over part of its length. Otherwise, the construction of the sensing element is the same as in FIG. 1.

Figure 3:
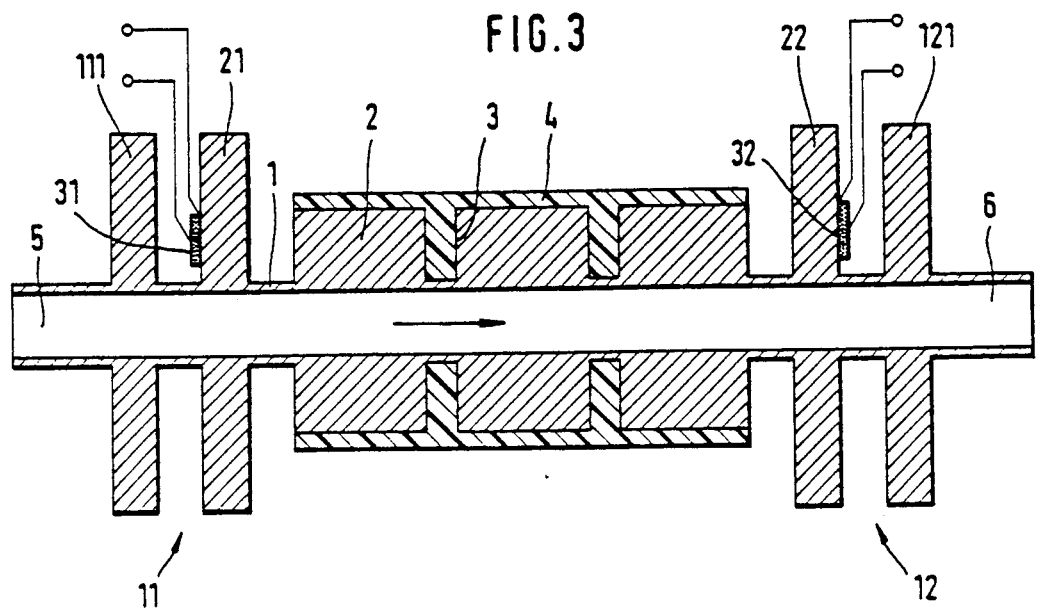
FIG. 3 shows a sensing element with annular grooves in the thickened wall which are filled with absorbing material.

FIG. 3 shows the application of an advantageous measure in the embodiment of FIG. 2 whereby an improvement in the absorption characteristics of the latter is achieved. To that end, annular grooves 3 are formed in the thickened wall 2. Advantageously, the bottom of each of these grooves lies at such a depth that the wall thickness in that area is equal to that of the section of pipe in the inlet and outlet areas.

FIG. 3 also shows that, according to a further feature of the invention, the annular grooves 3 may be filled with an absorbing material 4, e.g., a plastic, which in this embodiment also covers the cylindrical surface of the thickened wall 2, but this is not imperative. This results in a further improvement of the absorption characteristics.

With the two variants of FIG. 3, a mechanical longitudinal-wave filter can be implemented which prevents longitudinal waves from propagating in the wall of the section of pipe from one ultrasonic transducer to the other even if the transducer disks are close together.

Figures 4, 5:
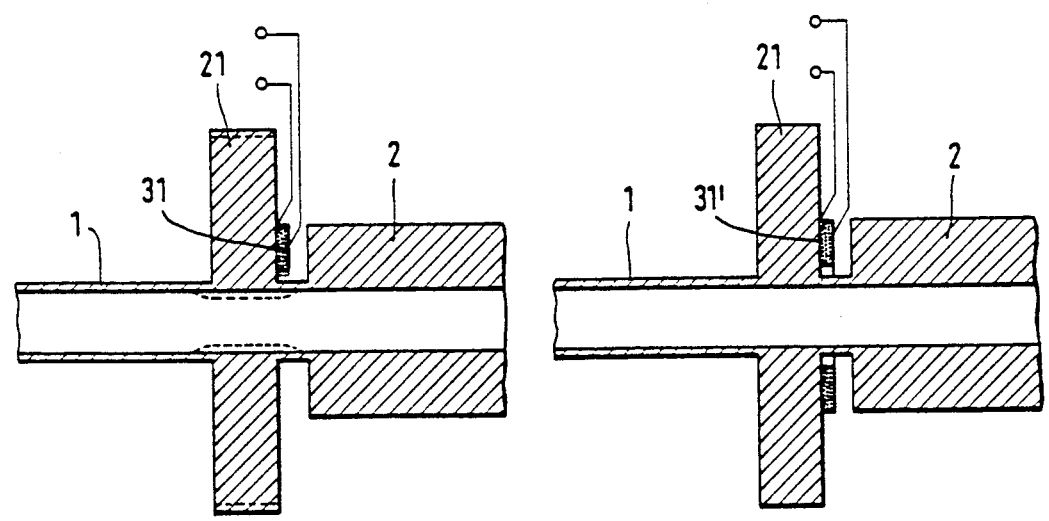
FIG. 4 shows a transducer disk with a disk-shaped ultrasonic transducer.
FIG. 5 shows a transducer disk with ring-shaped ultrasonic transducer.

FIG. 4 shows schematically how a transducer disk oscillates in the radial direction, eg. the dashed lines. The ultrasonic transducer 31 is a suitably dimensioned disk.

FIG. 5 shows that it is also possible to sue a ring-shaped ultrasonic transducer 31'.

Figure 6:
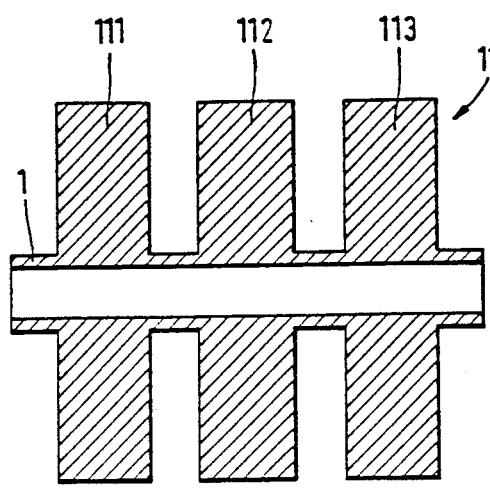
FIG. 6 shows a resonance absorber with three absorber disks.

FIG. 6 shows a resonance absorber with three absorber disks 111, 112, 113 which each have the same radial resonance frequency.

Figure 7:
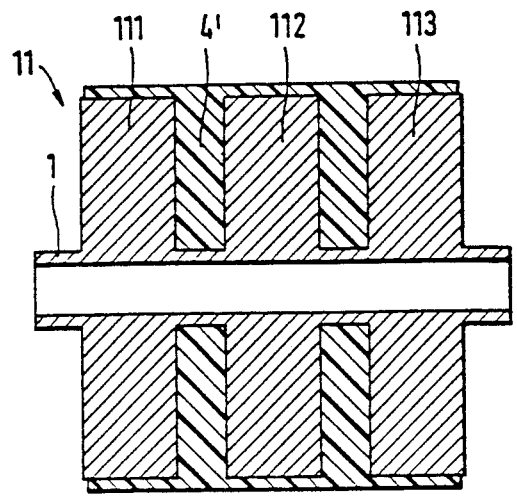
FIG. 7 shows the resonance absorber of FIG. 6 with absorbing material applied thereto.

FIG. 7 shows that the spaces between the three absorber disks 111, 112, 113 of FIG. 6 may be filled with an absorbing material 4', which may also cover the lateral surfaces of the disks if necessary. With this absorbing material 4', the same effects as with the absorbing material 4 in the arrangement of FIG. 3 can be achieved.

Figure 8:
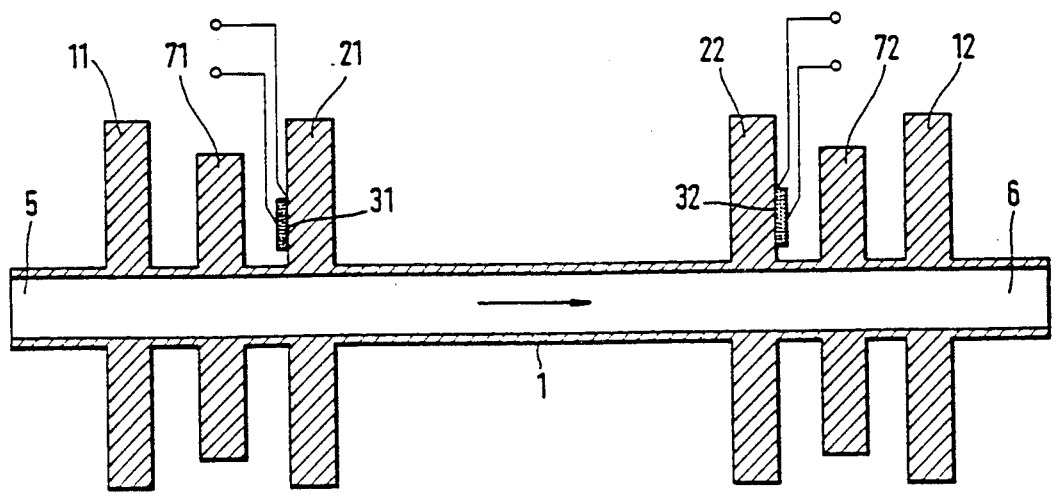
FIG. 8 shows a sensing element with decoupling disks.

FIG. 8 shows schematically another embodiment of the invention. A decoupling disk 71, 72 is interposed between each transducer disk 21, 22 and the adjacent absorber disk 11, 12. It serves to suppress any undesired coupling of sound energy to the transducer disk via the portion of pipe connecting the transducer disk with the absorber disk. The dimensions and/or the mechanical properties of the decoupling disk differ from those of the absorber disk.

In all of the embodiments shown in FIGS. 1 to 8, the absorber and transducer disks may be prefabricated parts which are fixed, e.g., press-fitted, to the section of pipe 1. With this construction, as mentioned above, different materials can be used for the section of pipe and the disks. On the other hand, if the sensing element may be made of one and the same material, it is also possible to form it as one piece, e.g., by precision casting or turning etc.

Figure 9:
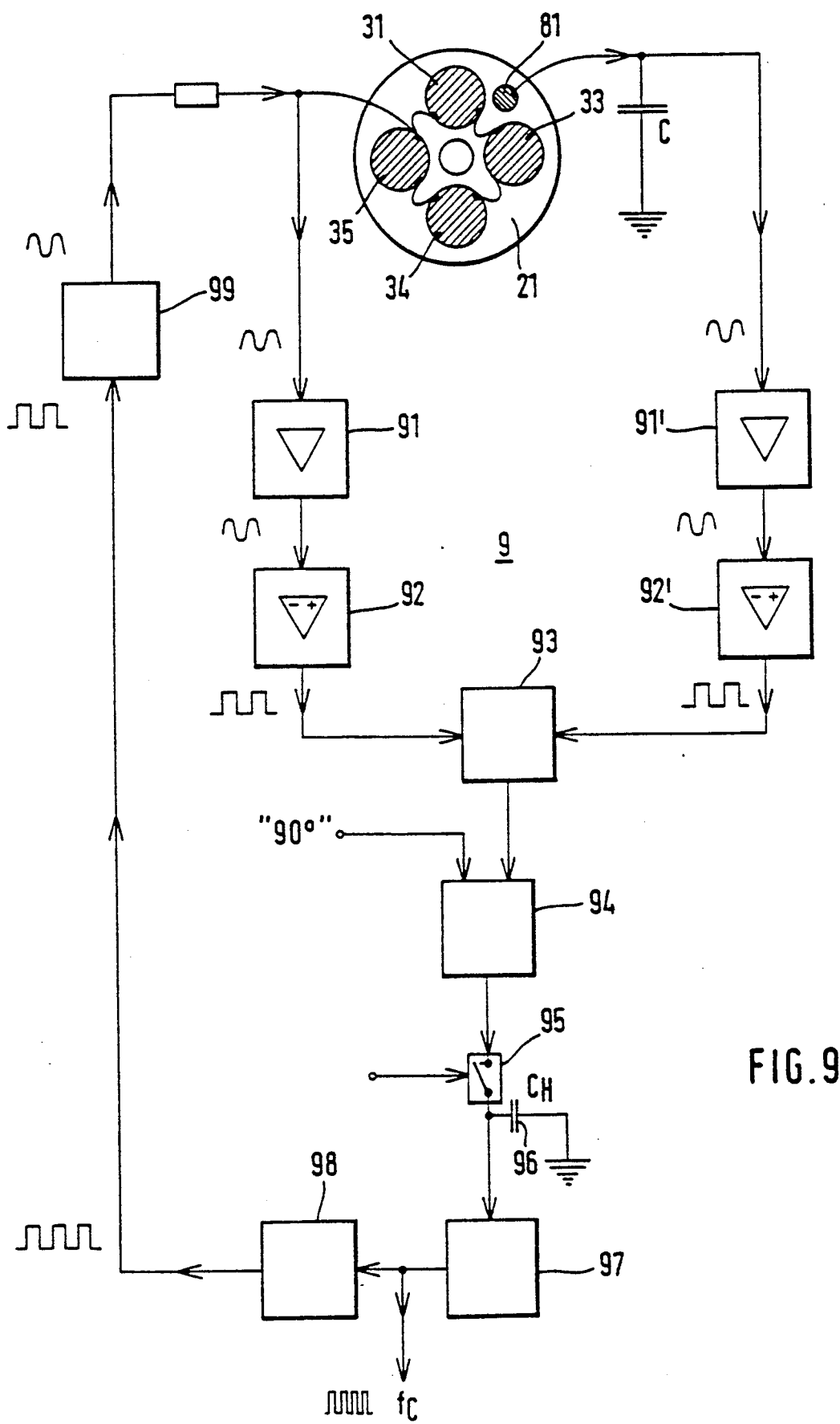
FIG. 9 is a block diagram of phase-locked loop for generating an excitation signal for the ultrasonic transducers.

The block diagram shown in FIG. 9 illustrates how an excitation signal for the ultrasonic transducers can be generated in such a way that the respective transmitting transducer will always excite the associated transducer disk at the resonant frequency of the latter. This is accomplished by means of a phase-locked loop 9. The transducer disk 21 is shown in a side view, so that the parallel-connected ultrasonic transducers—here four transducers 31, 33, 34, 35—and an ultrasonic sensor 81 can be seen in a top view.

The excitation signal in the form of a (high-frequency) sinusoidal voltage is applied not only to the transducers 31, 33, 34, 35, but also to a voltage amplifier 91. In similar fashion, the ultrasonic sensor 81, which is grounded through a shunt capacitor C, is connected to the input of a voltage amplifier 91'. By means of the capacitor C and the input resistance of the voltage amplifier 91', a sufficiently large time constant of the sensor 81 is achieved. The outputs of the two voltage amplifiers 91 and 91' are coupled to the inputs of sine-to-square-wave converters 91 and 92', respectively. These may be implemented, for example, as overdriven amplifiers.

The output of each of the two sine-to-square-wave converters 92, 92' is connected to one input of a phase comparator 93 with a low-pass filter which provides a voltage proportional to the phase difference between the excitation signal and the signal from the ultrasonic sensor 81. This voltage and a signal "90°" for a 90° phase shift are applied to a controller 94, whose output provides a voltage which can be interpreted as information on the resonance frequency. This output voltage is applied to a voltage-controlled oscillator 97 whose frequency $f_C$ corresponds to the frequency of the excitation signal except for a constant factor presettable by means of a frequency divider 98. The output of the frequency divider 98 is coupled to the input of a square-to-sine-wave converter 99. The phase comparator can be implemented with a simple exclusive-OR gate.

To avoid having to provide one phase-locked loop for each of the two ultrasonic transducers, which are operated alternately as transmitters and receivers, the phase-locked loop 9 includes a switch 95 which is opened shortly after the locked condition has been achieved. The voltage corresponding to the locked condition is stored in a hold capacitor $C_H$ during a full measurement cycle (measurement in the downstream and upstream directions). Before a new measurement cycle, the excitation signal can be locked to the correct resonance frequency again.

The sensor 81 can also be used to monitor the correct functioning of the associated transducer disk and the transducers on this disk.

We claim:

1. Sensing element for an ultrasonic volumetric flowmeter which
is to be installed in a pipeline conducting the fluid to be measured and
includes a straight section of pipe with an unrestricted cross-sectional area and an uninterrupted wall to the external surface of which are positively fixed, successively in the downstream direction and in a spaced-apart relationship:
a first resonance absorber at the inlet end including at least one absorber disk,
a first transducer disk having a first ultrasonic transducer attached to one lateral surface thereof which excites the radial resonance frequency of said first transducer disk,
a second transducer disk having a second ultrasonic transducer attached to one lateral surface thereof which excites the radial resonance frequency of said second transducer disk, and
a second resonance absorber at the outlet end including at least one absorber disk,
the absorber disk being dimensioned so that their respective radial resonance frequencies are equal to the excitation frequencies of the associated ultrasonic transducers.

2. A sensing element as claimed in claim 1 wherein the section of pipe and the transducer and absorber disks are made of metal.

3. A sensing element as claimed in claim 2 wherein the section of pipe, the transducer disks, and/or the absorber disk are made of different metals.

4. A sensing element as claimed in claim 3 wherein the transducer and absorber disks are made of the same metal with as low a thermoelastic coefficient as possible, and wherein the section of pipe is resistant to corrosion.

5. A sensing element as claimed in claim 3 wherein the transducer disks have a mechanical Q which is large compared to that of the absorber disks.

6. A sensing element as claimed in claim 1 wherein the wall of the section of pipe is thickened over part of its length between the transducer disks.

7. A sensing element as claimed in claim 6 wherein the thickened wall has at least one annular groove.

8. A sensing element as claimed in claim 7 wherein the annular groove is filled with an absorbing material, which also covers the cylindrical surface of the thickened wall if necessary.

9. A sensing element as claimed in claim 1 wherein at least two absorber disks are provided, and wherein the spaces between said absorber disks are filled with an absorbing material.

10. A sensing element as claimed in claim 1 and comprising a decoupling disk between the respective transducer disk and the adjacent absorber disk, with the dimensions and/or the mechanical properties of the decoupling disk differing from those of the absorber disk.

11. A sensing element as claimed in claim 1 and comprising an ultrasonic sensor on one of the transducer disks which is included as an actual-valve transmitter in an electronic phase-locked loop for generating an excitation signal for the ultrasonic transducers which is locked to the resonance frequency of the transducer disks.

12. A sensing element as claimed in claim 9 wherein the lateral surfaces of the absorber disks are covered with the absorbing material.

* * * * *